Dec. 22, 1942.   W. C. RAGALS   2,306,345
METHOD OF PRODUCING SAUSAGE CASINGS
Filed Nov. 8, 1941
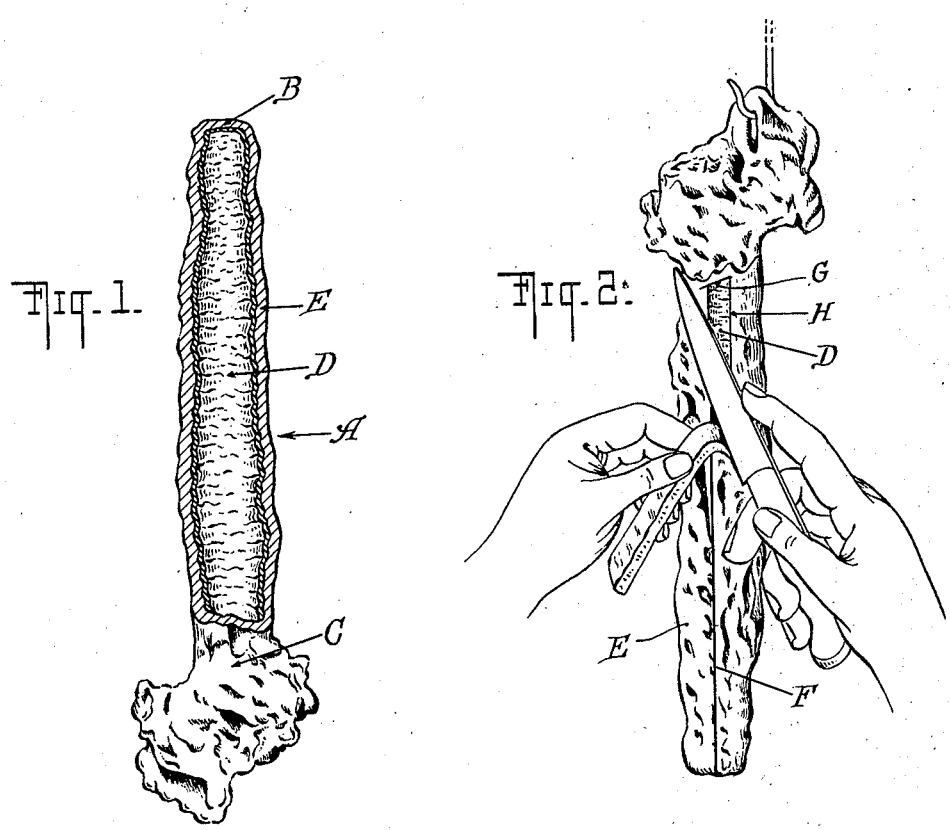
WITNESS
G. V. Rasmusen
INVENTOR
WILLIAM C. RAGALS
BY
ATTORNEYS Patented Dec. 22, 1942

2,306,345

UNITED STATES PATENT OFFICE 2,306,345

METHOD OF PRODUCING SAUSAGE CASINGS

William C. Ragals, New Rochelle, N. Y., assignor to Berth, Levi & Co., Inc., New York, N. Y., a corporation of New York Application November 8, 1941, Serial No. 418,331

3 Claims. (Cl. 17—45)

This invention relates particularly to the art of preparing sausage casings and the like.

Natural sausage casings are usually produced from the intestines of sheep, cattle or hogs and as such intestines in their natural state are curly and tapered, they are treated and stretched in the manufacture of the casings, so that they will produce casings having relatively smooth surfaces and substantially uniform diameters. As the intestines are relatively inelastic the degree to which they can be stretched without making them too thin and weak, is limited. For instance, large beef middles which vary from about one and one-quarter inches to a maximum of approximately two and one-half inches are enlarged usually from about one-eighth to one-half an inch by stretching. Consequently, when larger casings are required, it is customary to make the same by joining together two or more smaller casings in such manner as to produce an enlarged casing of the desired diameter. These composite casings, however, do not provide satisfactory finished products for certain purposes, for example, in the larger sizes of sausages of the order of four to five inches in diameter. For such purposes the art has utilized to some extent beef bladders but as the latter are pear or ball shaped they leave much to be desired.

It is the purpose of the present invention to so treat the rectum of cattle as to remove the mass of tendons and tissues adhering thereto and to widen and straighten them so that they provide large relatively uniform casings suitable for the larger sizes of sausages.

In the accompanying drawing, Fig. 1 is a longitudinal cross-sectional view of a cattle rectum as it comes from the animal and Fig. 2 is a longitudinal view of such rectum illustrating the steps of removing the exterior material from the gut-like inner wall thereof.

The rectum of cattle extending from the anus to the beginning of the large intestine or beef middle and designated A in the drawing is usually about ten inches long and has an inside diameter which varies from about one and one-half inches at its narrow end B to about two and one-half inches at its larger or outer end C. The exterior of the gut-like wall D of the rectum is covered with a mass of tendons and fatty tissues which are in a layer E approximately one-half inch thick around the gut D. Because of the apparent shortness of the rectum, its apparently small diameter which is no larger than the normal diameter of the beef middle and the mass of fat and tissues which cover it, the rectum is usually thrown away and not utilized by the trade in the making of sausage casings. It has been found, however, that the gut-like portion D of the rectum is maintained by the layer E of tendons and fatty tissues in a folded or crinkled condition so that if such material could be successfully removed without damage to the gut-like inner wall, it would be possible to obtain a casing materially larger than those which are obtained from large beef middles. After much experimentation it was found how this end could be accomplished readily.

In accordance with the present invention, the rectum A after its separation from the beef middle of the animal, is suspended from one end by hanging it on a hook. Preferably the wide end or anus C of the rectum is connected to the hook. With the use of a keen bladed knife longitudinally extending strips of the surrounding layer of tendons and fatty tissues are then removed. This is accomplished by first making a longitudinal slit F extending the entire length of the rectum and approximately one-half inch deep so that the point of the knife will be just short of contact with the outer folds of the layer of gut. A short transverse cut G is then made at the anus and then a second longitudinal slit H is made from the anus to the other end, the knife blade being turned toward the first slit F so as to undercut the strip and the operator tearing the strip from the rectum as it is being cut. In a similar fashion succeeding strips of the exterior layer are slit off until such layer is substantially removed. Great care and skill is required during this operation to prevent the inner gut layer from being cut and consequently rendered useless. As a result of the removal of the binding layer of tendons and fatty tissues, the inner gut wall D unfolds to some extent. The exterior of the gut wall or tube D of the rectum is then cleaned by closing one end thereof in a manner well known in the art and then blowing it up with air so that the gut or skin will be sufficiently stretched to render it possible to ascertain if there are any tissues remaining on its exterior surface and, if so, these are removed. The gut can either be turned inside out and salted for shipping or the blown and stretched gut dried by hanging it up in a drying room or in the sun. Instead of drying the gut in a blown condition, it may be dried on an expansible former which may include a pair of elongated rail members which are positioned within the gut and then spread apart by means of either a spreader member forced between the rails or by links whose movements are controlled by a screw-threaded rod, as is disclosed in my Patent No. 1,945,866 issued February 6, 1934, to impart to the gut a flat substantially uniform shape.

As a result of the foregoing process, the gut-like inner wall of the rectum is lengthened from its natural state of about ten inches long to from twenty-two to thirty-six inches and is increased from a maximum of about two and one-half inches to about four to five and one-half inches in diameter depending upon the age and size of the animal from which it was obtained. The thus treated gut makes a superior casing for large sausages in that the walls of the gut are relatively thin and include no veins or other adhering substance and will be of relatively uniform diameter.

I claim:

1. The method of preparing casings for large sausages which comprises taking the natural rectum of cattle, and removing the binding layer of tissue in relatively narrow lengthwise strips to enable the folds thereof to be released.

2. The method of preparing casings for large sausages which comprises taking the natural rectum of cattle, hanging the same in suspended fashion, removing the binding layer of tissue in longitudinally extending strips to release the folds thereof and then treating the thus tissue-freed rectum to form it into a casing suitable for the reception of sausage meats.

3. The method of preparing casings for large sausages which comprises taking the natural rectum of an animal, removing the binding layer of tissue in longitudinally extending strips to release the folds thereof, placing the walls of the resulting gut under tension and then cleaning the exterior surface of the same.

WILLIAM C. RAGALS.